United States Patent [19]
Smith

[11] Patent Number: 5,238,125
[45] Date of Patent: Aug. 24, 1993

[54] BICYCLE PARKING AND STORAGE RACK

[76] Inventor: Terrance R. Smith, 13 Bateman Drive, Nepean, Ontario, Canada, K2G 4N7

[21] Appl. No.: 948,686
[22] Filed: Sep. 22, 1992
[51] Int. Cl.⁵ .............................................. A47F 7/00
[52] U.S. Cl. ........................................... 211/5; 70/58; 211/19; 211/22
[58] Field of Search .................... 211/5, 18, 19, 20, 22; 70/58, 62

[56] References Cited

U.S. PATENT DOCUMENTS

| | | | |
|---|---|---|---|
| 706,718 | 8/1902 | Bradbury | 211/22 |
| 3,820,662 | 6/1974 | Steers | 211/22 X |
| 3,863,767 | 2/1975 | Garwood | 211/20 X |
| 3,907,114 | 9/1975 | Ewers | 211/22 X |
| 3,918,279 | 11/1975 | Williamson | 211/5 X |
| 4,316,544 | 2/1982 | Goldstein | 211/5 |
| 4,352,432 | 10/1982 | Smith | 211/5 X |
| 5,036,987 | 8/1991 | Smiedt | 211/20 X |

Primary Examiner—Robert W. Gibson, Jr.
Attorney, Agent, or Firm—Bauer & Schaffer

[57] ABSTRACT

A bicycle parking and storage rack that is designed to receive one or more bicycles in vertical position. Locking means permit the frame and front and rear wheels of a bicycle to be secured to the rack and include a pivotable means to selectively open and close the upper locking means. The rack according to the invention occupies a minimum of space and can be conveniently mounted on a wall or the like, or in a radial arrangement to accommodate up to ten bicycles.

8 Claims, 5 Drawing Sheets

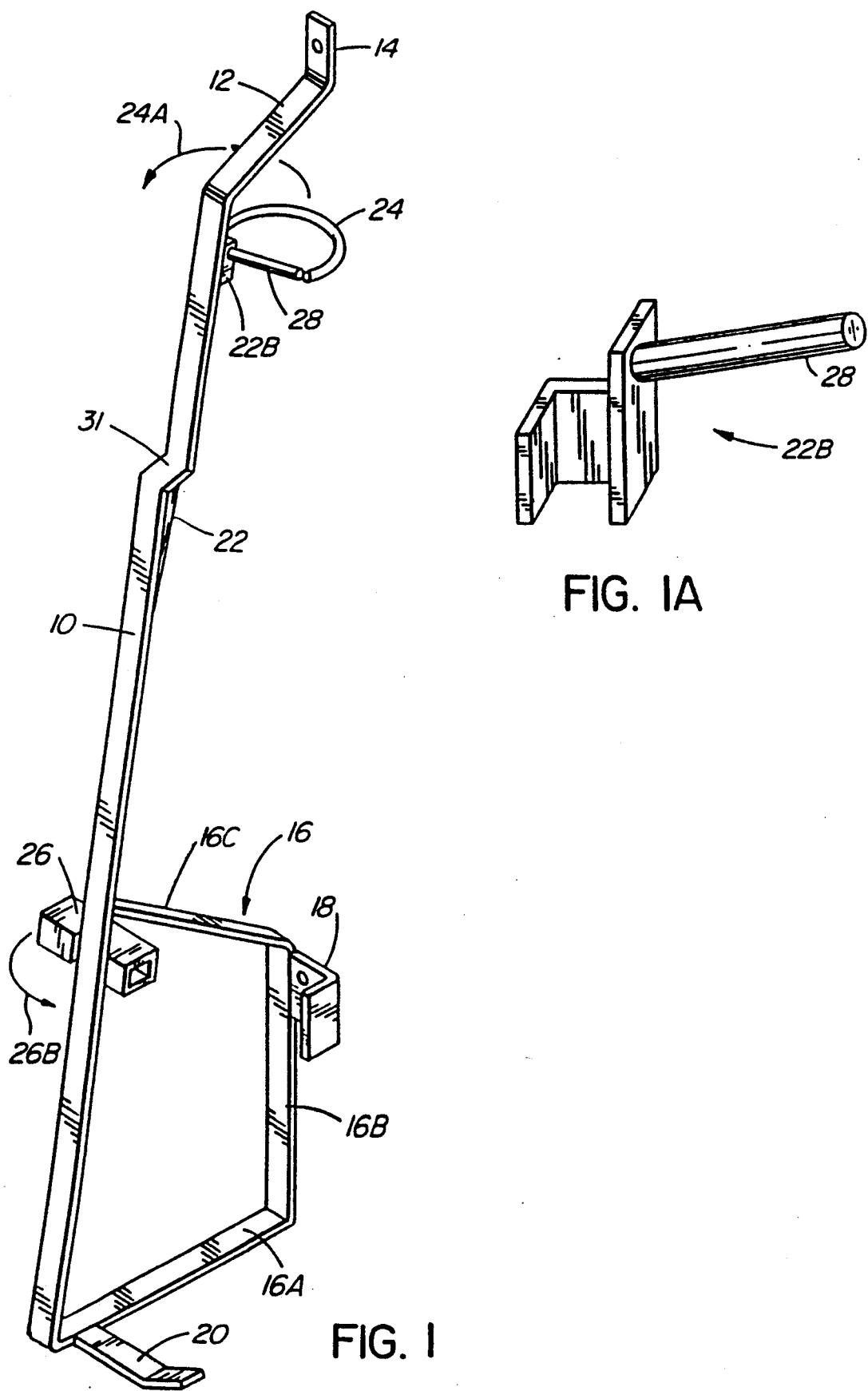
FIG. IA
FIG. I

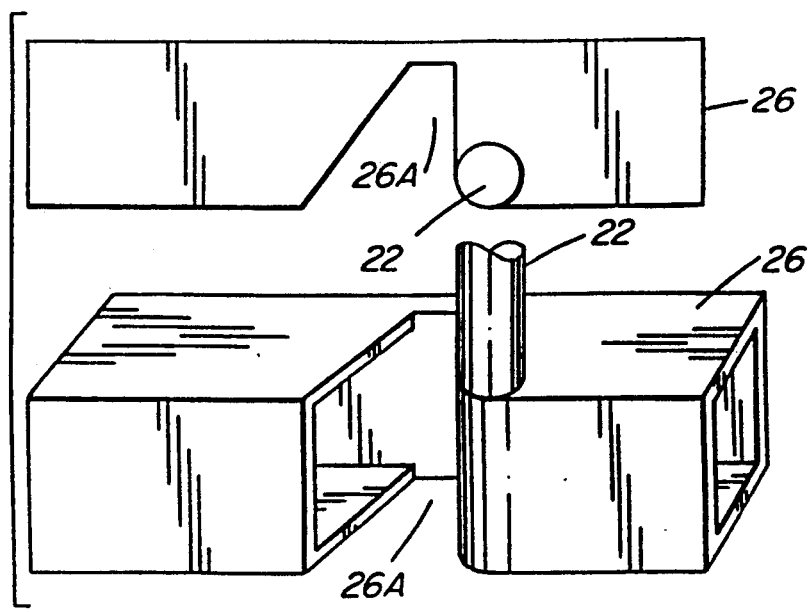
FIG. IB
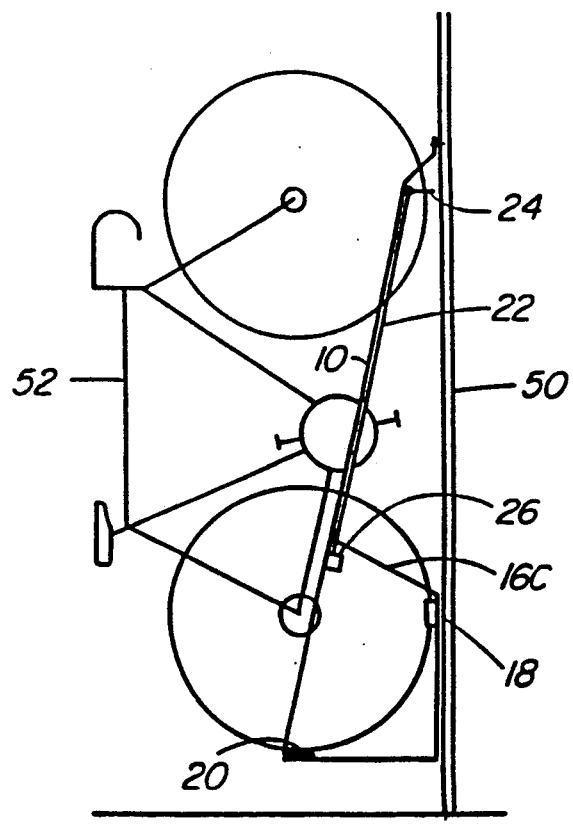
FIG. IC

BICYCLE PARKING AND STORAGE RACK

The invention relates to apparatus that is adapted to hold bicycles in a vertical position for parking or storage purposes. The apparatus is unique in its inclusion of rotatable locking means in association with support means for a bicycle whereby both wheels of a bicycle, as well as the bicycle frame, are quickly and simply yet securely locked to the supporting stand.

The apparatus is also unique in that the means used to engage and support a bicycle's wheels is not restricted to a particular tire width as is the case with bicycle racks that hold wheels in a channel or other restrictive configuration.

There is a need today for a bicycle parking system that takes up as little space as possible, provides security for both wheels of a bicycle as well as its frame, using only one lock, and to accommodate bicycles throughout every season of the year without impeding general maintenance such as snow removal, floor washing or grass cutting around and under the parking system. It is the primary objective of this invention to do all of these things and to do so in such a manner that parking and locking of a bicycle can be achieved with as little effort as possible by users.

A key feature of the apparatus is the arrangement of steel bars, rods and tubes that, when used in conjunction with popular bicycle U-locks, make theft of a bicycle extremely difficult. Depending on the manner in which a U-lock is attached, a thief must cut through three or more such steel bars, rods and/or tubes before the bicycle can be removed, and even then the U-lock remains engaged on the bicycle to prevent the bicycle from being used.

As will become clear hereinafter, the apparatus, when locked with a U-lock, securely engages both wheels and frame of a bicycle. Steel cable security can be added in addition to or in lieu of U-lock security.

Another key factor is that cyclists who use chains or cables for security, instead of U-locks, can easily spiral their cables or chains around the main support bar of the apparatus and through both wheels and the frame of their bicycles with less effort than is normally required for any other bicycle parking system.

Bicycles parked in the vertical position take up approximately 40% less space than bicycles parked in the horizontal position. (Normal bicycle length is 70 inches. This length in the horizontal position plus a 24 inch width for popular wide handlebars equals 1680 sq. inches. The same bicycle in the vertical position requires the same 24 inches for handlebars but only 36 to 40 inches for the seat (saddle) height. $24 \times 40$ inches equals 960 sq. inches or nearly 43% less space. And, when you arrange bicycles radially in a circle in the vertical position, the saving in space is even more: 92 in. dia. for ten bicycles=$(92 \times 92 \times 0.7854)$ 6647.6 sq. inches or 665 sq. inches for each bicycle which is a saving of over 60% in bicycle parking space.)

A further advantage of the bicycle parking and storage apparatus of the subject invention is the reduction of extra space normally required to place a bicycle in the rack and remove it.

A further object of the invention is to permit vertical bicycle parking on uneven walls or surfaces, such as the rough limestone and sandstone walls found on the buildings of many institutions such as government buildings, university buildings and the like and to allow removal of the vertical parking apparatus to facilitate restoration work. A further advantage of one of the embodiments according to the invention is the provision of a bicycle rack that is elevated from the ground so that snow removal, or other cleaning or maintenance is not inhibited.

A still further object of the invention is to provide bicycle parking and storage apparatus that is relatively inexpensive to manufacture, extremely durable, and modern in appearance.

A further objective is to position a bicycle on the bar that supports it in such a manner that the deraileur, chain wheels and other sensitive parts of a bicycle's power train do not come in contact with the rack itself, thereby eliminating the cause of damage commonly caused by many poorly designed bicycle parking systems.

A further object of the invention is to provide apparatus to secure a bicycle in vertical position involving the use of only a single moving part, adapted at its upper end automatically to secure a front wheel of a bicycle, and at its lower end to provide locking means for the rear wheel and frame of the bicycle using only a bicycle U-lock.

A further object of the invention is to provide a rack for the parking or storage of bicycles including means to support and stabilize the rear wheel of a bicycle, when in vertical, locked position on a rack. As will become clear hereinafter the means to support and stabilize the rear wheel of the bicycle serves three functions, namely, to hold a bicycle elevated above the ground, to support the tire of the bicycle and allow clearance for a rear wheel fender and to prevent sideways movement.

A principal objective of the invention is to provide a bicycle parking and storage rack comprising: support means adapted to support a bicycle in a vertical position including an upper pin adapted to engage a front wheel of a bicycle and a lower support means for a rear wheel of a bicycle; locking means pivotably mounted in brackets on the inside (or underside) of said support means having an open loop or L-shaped finger at the upper end thereof adapted to be pivoted into contact with the said upper pin and to enclose or capture a bicycle wheel supported by said pin so that the wheel cannot be removed; and an enclosed channel or stationary bracket at the lower end of said locking means adapted so that a U-lock passing through the channel or bracket will secure a bicycle's chain stays or seat stays and rear wheel and at the same time prevent movement of the open loop or L-shaped finger that secures the bicycle's front wheel at the upper end.

A further objective is to stabilize the main support bar with support to prevent twisting on the bar and thereby prevent movement of the locking apparatus on the back thereof.

A still further object is to provide a bicycle parking and storage rack comprising a plurality of radially arranged parking and storage segments, each segment having: support means adapted to support a bicycle in a vertical position including an upper pin adapted to engage a front wheel of a bicycle and lower support means for a rear wheel of a bicycle; locking means pivotably mounted to the right of and on the adjacent support means having an L-shaped finger at the upper end thereof adapted to be pivoted into contact with the adjacent upper pin and to capture the front wheel of a bicycle supported by the said adjacent pin. Another object of the invention is to provide a single-bicycle parking and storage rack in which the locking mechanism is positioned such that it will not be blocked by kickstands commonly attached to bicycles, and further in which the support means is fashioned to give sufficient space between said support means and the bicycle when in position to allow kickstands or extra-wide bicycles to be accommodated effectively.

Another object of the invention is to provide a multiple bicycle parking and storage rack with a straight bar at the lower end of the locking means oriented to project across the opening of the radially arranged parking and storage segment when the L-shaped finger at the upper end of the locking means is in the open position; and further, with the straight bar being positioned so that a rear wheel of a bicycle being inserted into the storage segment will strike the straight bar and push it inwards, moving the locking means and hence the L-shaped finger at the upper end of the locking means. This finger will be positioned so that as the straight bar is pushed inwards by the rear wheel the finger will rotate to the closed position and engage the upper pin and lock the front wheel in place.

It is a further object of the invention to provide a stationary bracket attached to the outside of the support means, through which a portable locking device may be passed and attached through the bicycle seat stays instead of the chain stays if so preferred.

Applicant's invention is embodied in two principal variants, both employing a one-component locking member. The embodiments which will be discussed in detail hereinafter have been designed to store, or park, a single bicycle, or a plurality of bicycles.

These and other objects of the invention will become apparent with reference to the following description.

Reference will now be made to the accompanying drawings, namely:

FIG. 1 is a perspective view of a rack adapted to accommodate a single bicycle;

FIG. 1A is an enlarged perspective of a support assembly for the front wheel of a bicycle;

FIG. 1B is an enlarged perspective and related top plan of the lock assembly of FIG. 1;

FIG. 1C is a schematic of the rack of FIG. 1, showing a bicycle supported thereby;

Detailed reference will now be made to the drawings, wherein like reference numerals will identify like parts.

Figure 1D:
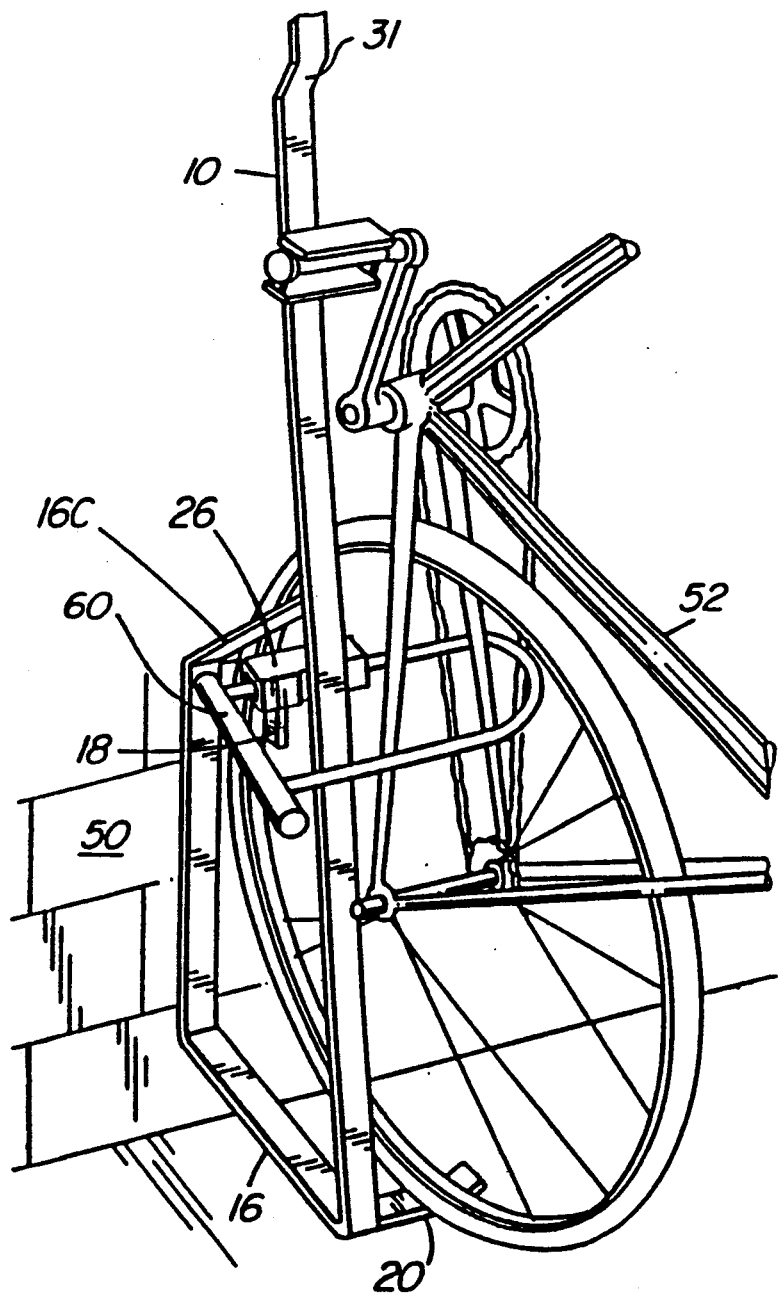
FIG. 1D is a perspective view of the lower portion of the rack of FIG. 1, with a portion of a bicycle supported by and secured thereto.

Referring now to FIG. 1, a rack to receive a single bicycle, designed to be supported by a wall or other surface, is illustrated. The rack is comprised of a vertical bar 10 having a unitary upper portion 12 which slopes upwardly and inwardly and includes a vertical end piece 14 adapted to be secured to a wall or the like as by a lag bolt or the like. Note that bar 10 is fashioned with an offset at 31, which has been found in actual usage situations to be necessary in order to give bicycle kickstands (not shown) clearance relative to bar 10.

At the lower end of bar 10 a U-shaped rack member illustrated generally at 16, projects inwardly in alignment with upper portion 12. Rack member 16 includes horizontal lower arm 16A, upwardly projecting vertical arm 16B, and upper arm 16C which slopes inwardly and downwardly from bar 10 to vertical portion 16B A wheel engaging L-shaped member 18 is affixed near the top of vertical arm 16B, on the right side thereof. Arm 16B or member 18 also includes at least one opening 16D, adapted to receive a lag bolt or the like, for securement to a supporting vertical surface.

A lower wheel support 20 angled up at the outside end extends outwardly from arm 16A, near bar 10, on the same side thereof as wheel engaging L-shaped member 18. Wheel support 20 is adapted to support a tire of a rear wheel of a bicycle when mounted on the rack (see FIGS. 1C and 1D) and to prevent sideways movement.

Pivotably mounted inside U-shaped bracket at 22B on the inner surface of bar 10 is a rod 22, rod 22 having a semi-circular unitary front-wheel locking loop 24 at its upper end and, at its lower end, a U-lock-receiving channel member 26 (see also FIG. 1B.) Rod 22 passes through a bearing hole in member 16C (hole not shown). A fixed front-wheel supporting pin 28 projects upwardly and inwardly from the side of bracket 22B. With reference to FIG. 1A, bracket 22B is clearly illustrated, with pin 28 projecting slightly upwardly and slightly inwardly therefrom. The interior of bracket 22B is adapted to restrain but permit rotation of vertical rod 22, from which locking loop 24 extends. Pin 28 is in alignment with locking loop 24 so that, when loop 24 is in the closed position, it is in contact with the end of wheel-supporting pin 28, as illustrated in FIG. 1.

A channel member 26 is mounted for rotation at the bottom of rod 22. Channel 26 is more clearly illustrated in FIG. 1B. Channel 26 is of open configuration, with an inwardly projecting notch or opening 26A, that allows rotation of the channel member 26 at a right angle to bar 10 when in the open or unlocked position as will become clear hereinafter.

As seen in FIG. 1, the rack assembly is shown in closed position. Channel 26 is adapted to be manually rotated in the direction of arrow 26B, causing front wheel loop 24 to pivot in the direction of arrow 24A, thus pivoting rod 22 and hence wheel loop 24 to its open position. In such open position it is possible to engage the front wheel of a bicycle on supporting pin 28. When the front wheel of a bicycle is engaged on supporting pin 28, the rear wheel of the bicycle will be engaged in L-shaped support member 18, and on bicycle support arm 20, with the bicycle fender, if any, projecting below arm 20.

When a bicycle has been mounted on the rack of FIG. 1, lock member 26 is manually rotated by the bicycle owner to the position illustrated in FIG. 1, thus rotating front wheel loop 24 to the position shown in FIG. 1, so that the front wheel of the bicycle is supported by pin 28, and surrounded by wheel loop 24 so that the front wheel of the bicycle so supported cannot be removed.

With the bicycle mounted on the rack of FIG. 1, and the front wheel secured by wheel loop 24, a U-lock 60 may be inserted through channel 26, as illustrated in FIG. 1D, to engage both chain stays and the rear wheel of the bicycle. As seen in FIGS. 1 and 1D, the opening of channel 26 is adapted to engage one arm of a bicycle U-lock, the other arm passing beside bar 10, with both arms of the U-lock then enclosing both chain stays as the U-lock arms pass through the rear wheel of a bicycle. Note that channel 26 is situated so that its operation is not impeded by bicycle kickstands (kickstand not shown).

Figure 2:
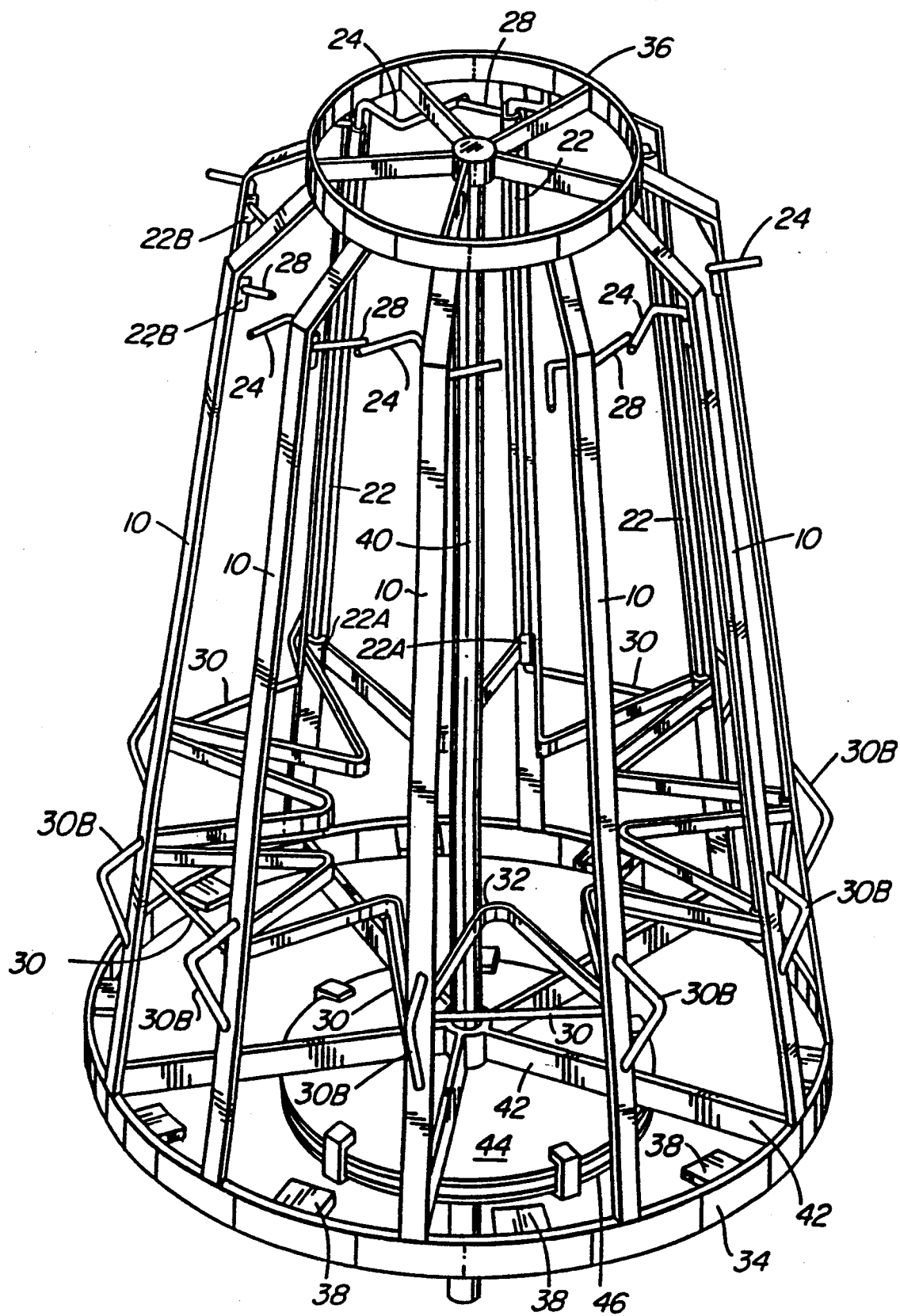
FIG. 2 is a perspective view of an embodiment of the invention adapted for parking or storage of a plurality of bicycles.

When mounting the rack according to FIGS. 1 and 2 on a supporting vertical surface, the bottom of the rack will be elevated sufficiently above the floor or ground so as to leave room therebelow so that the rear fender of a bicycle is elevated above the floor or ground. It will be desirable in some instances to elevate the rack sufficiently above the ground so as to permit easy snow removal, sweeping, grass cutting or the like. FIG. 1D illustrates the rack in mounted position, a wall 50 supporting a bicycle 52. It will also be desirable in some instances to mount the rack on straight anchor pins projecting from rough surfaces such as stone walls so that the racks can be removed to facilitate stone restoration work.

As will be evident from the foregoing, parking a bicycle in the rack of FIG. 1 is both quick and simple and securement for an unattended bicycle can be achieved using a chain, cable or U-lock as a cyclist prefers.

Referring again to FIG. 1D, it will be seen that the locking channel 26 is positioned adjacent the chain stays of a bicycle, rather than higher on the storage rack so as to make it easier for the user to secure the lock, that is, to minimize the amount of reaching that must be done while securing the bicycle. In many environments a plurality of racks according to FIG. 1 will be installed side-by-side, with a minimum amount of space therebetween, and it will be observed that a minimum amount of space is in fact all that is needed simply and easily to place a bike in storage position and to remove it therefrom.

Rear wheel engaging member 18 ensures that the wheel of the bicycle is held securely, when a U-lock is in engagement with the rear wheel and chain stays, so as to prevent sideways movement of the rear wheel, and thus, disengagement from L-member 18. The security of the bicycle is thus assured.

Reference will now be made to a further embodiment of the invention, which includes the essential elements already described with reference to FIG. 1, that is, upper wheel securing means and lower wheel locking means, as well as support means for the rear wheel of a bicycle.

Figure 2B:
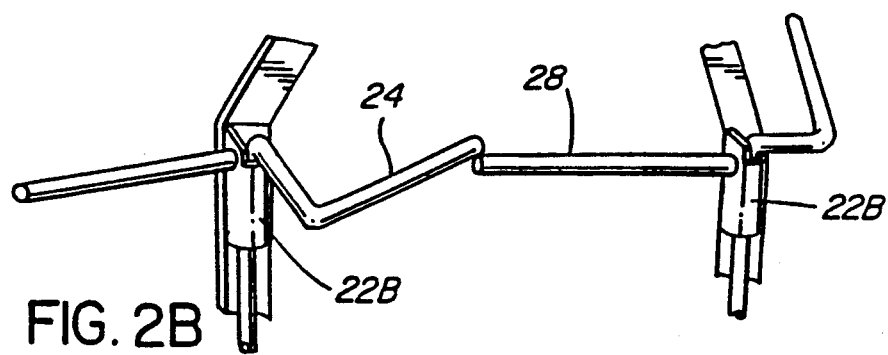
FIG. 2B is a perspective of support and locking pins for the top of rack in FIG. 2.
Figure 2A:
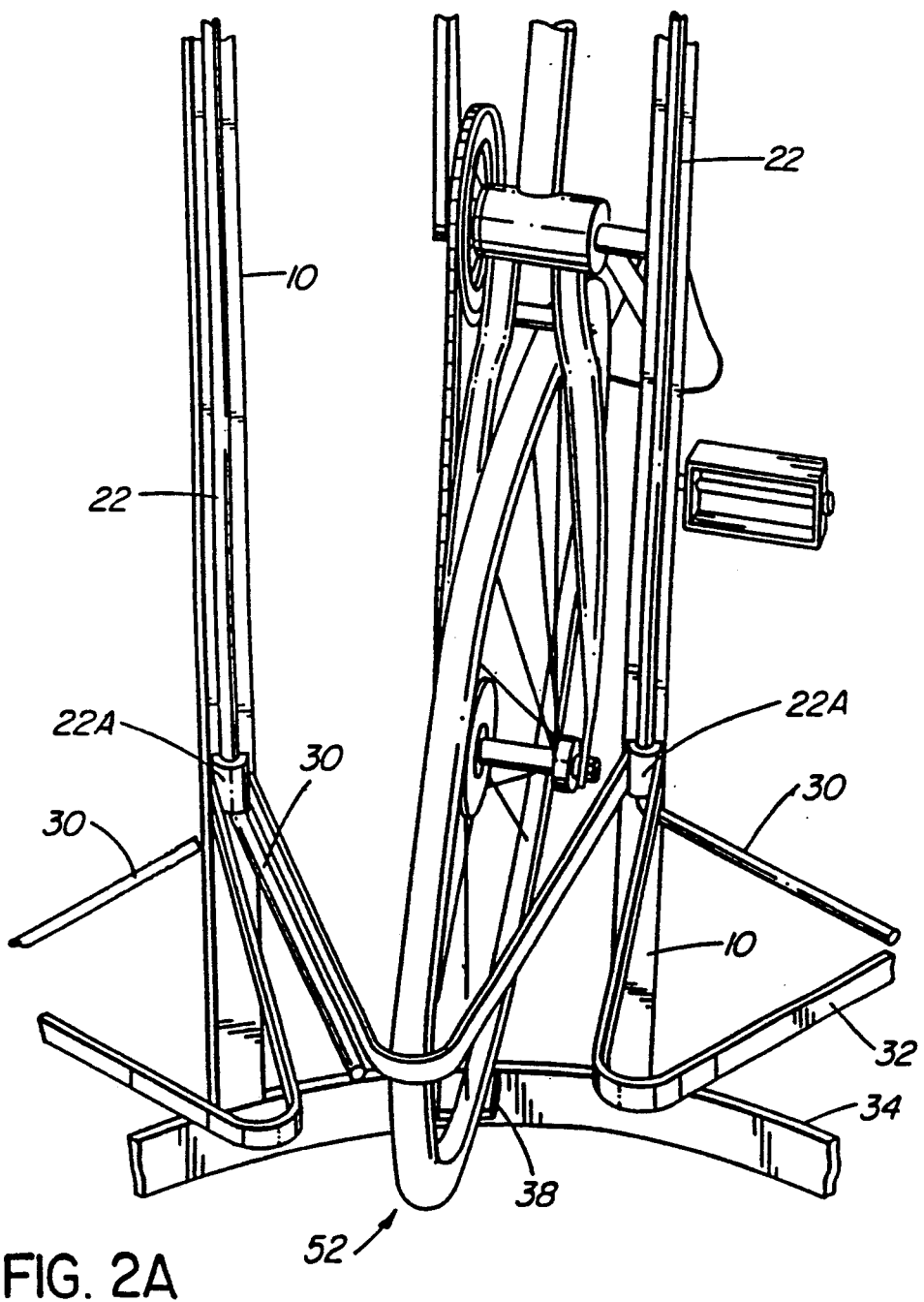
FIG. 2A is a perspective view of a portion of the bottom of the rack of FIG. 2, with the lower portion of a bicycle inserted therein.

Referring now to FIGS. 2 and 2A, a revolving stand to support a plurality of bicycles is illustrated. As will be noted below, each section of the multiple-bicycle stand illustrated in FIG. 2 includes the same components already described for the single-bicycle rack or variations thereof adapted to meet slightly different needs.

The stand of FIG. 2 includes ten sections or segments, representing the optimum number of bicycles that may be stored or supported by a stand (that is to minimize waste space in the center portion of the stand). More or less sections can be provided depending on the particular needs of the owner and the space available.

The rack of FIG. 2 includes a plurality of vertical bars 10 each supporting U-shaped brackets 22A and 22B inside of which rods 22 rotate and an upper finger 28 attached at a specific angle to bracket 22B to receive and support the front wheel of a bicycle.

When the device is in the open position, L-shaped extension 24 of the top of rod 22 points to the outside, towards the cyclist, and straight pin 30 projects inwardly at the bottom of rod 22 across the opening, that is between two adjacent rods 10.

Located on rods 22 immediately under and next to L-shaped extension 24 is bracket 22B, inside of which rods 22 rotate and on an extended lip of which is attached front-wheel pin 28. These are best seen on FIG. 2B.

Located on rods 22 immediately above and next to straight pin 30 is U-shaped bracket 22A inside of which rods 22 rotate.

U-shaped brackets 22A and 22B also restrict the up-and-down movement of rods 22 to prevent disengagement of L-shaped finger 24 from front-wheel pin 28.

Inwardly projecting V-shaped lower wheel support members 32 are supported by adjacent pairs of vertical bars 10. V-shaped handle 30B attaches to the outside of rod 10.

As is evident, bars 10 slope upwardly and slightly inwardly from a lower base hoop 34, at an angle that is parallel with most bicycle chain stays when bicycles are in position and are joined at the upper ends thereof by an upper connecting hoop 36.

A support pad 38 for the rear wheel of a bicycle projects inwardly from hoop 34 adjacent each of bars 10.

A center axle 40 extends upwardly from a plurality of radial arms 42 connected at their outer ends to hoop 34. Arms 42, in turn, are supported by a turntable 44, table 44 itself being supported by a plurality of bearings between table 44 and and base 46 or by bearings within the axle of 40 (bearings not shown). Thus the rack of FIG. 2 is manually rotatable on axle 40 to allow one-point entry and removal of bicycles.

Brackets 22A and 22B are unique in that they hold the rod 22 against the underside of bar 10 to restrict movement of rod 22 to an angle that will keep straight pin 30 in place and prevent movement of part 24 in FIGS. 1 and 2.

The ability to rotate the rack assembly results in an economy of space, that is, access to the rack need only be available from one point, so that the rack may be conveniently placed in a corner location or close to other racks of this type, maximizing use of available space.

To position a bicycle, the cyclist first ensures that the extension bar 24 is open and/or that the straight bar 30 is across the opening. Next the cyclist hooks the front wheel (not shown) on finger 28 and pushes the back wheel against straight bar 30, forcing it forward and rotating rod 22 (this can be seen best on FIGS. 2A and 2B) and hence upper extension 24, locking it against finger 28 and locking front wheel in place (front wheel not shown).

Finally the cyclist either wraps a cable or chain around bar 10 while at the same time threading the cable or chain through the bike frame and wheels, or inserts a U-lock through the chain stays or seat stays and through the V-bracket 30B on FIG. 2 or through the V-bracket and behind bar 10. This forces a thief to cut through up to two steel rods and a section of flat bar steel to remove a bicycle.

The positioning of V-bracket 30B outside device and the centering of the bicycle pad 38 facilitate locking and mean little likelihood of interference of kickstands or wide bicycles with bicycles in adjoining parking bays.

There is one minor difference in the embodiment of FIG. 2, as compared with the embodiment of FIG. 1. As has been indicated above, the L-shaped fingers 24 are adapted to be pivoted toward co-operating wheel-support fingers 28 on adjacent bars 10. Thus, in the embodiment of FIG. 2, on entry of a bicycle, straight pin 30 is pivoted to a position perpendicular to bottom hoop 34, with L-shaped locking finger 24 in parallel alignment with bottom hoop 34 (and top hoop 36), and in contact with adjacent front wheel supporting finger 28. That is, the front wheel of a bicycle is supported on finger 28, projecting from one vertical bar 10, but locked in place by L-shaped locking finger 24 projecting from the vertical bar 10 to the right thereof.

The upper finger 28 is not a means to hang bicycles as pins are normally used for. It is used to stabilize a bicycle in the vertical position so that the weight of the bicycle when parked is on its rear wheel and not on the inside of the front-wheel rim as happens when bicycles are hung. Note however that support fingers 28 project at a slight angle upwardly and inwardly, as can be seen on FIG. 2. Thus the bicycle front wheel is pulled through gravity against bar 10, preventing movement of the front wheel during heavy winds or the like.

The forgoing is by way of example and the invention should be limited only by the scope of the appended claims.

The embodiments of the invention in which an exclusive property or privilege is claimed are defined as follows:

1. A bicycle parking and storage rack comprising:
   support means adapted to support a single bicycle in a vertical position including an upper pin adapted to engage a front wheel of a bicycle and lower support means for a rear wheel of a bicycle;
   locking means pivotably mounted on said support means having an open loop at the upper end thereof adapted to be pivoted into contact with said upper pin and to enclose a bicycle wheel supported by said pin;
   and an enclosed channel at the lower end of said locking means adapted to be pivoted toward a rear bicycle wheel supported by said rack and to be engaged by a lock, said lock also being engageable with said lower wheel and chain stays associated therewith.

2. A bicycle parking and storage rack according to claim 1, said lock being a bicycle U-lock.

3. A bicycle parking and storage rack according to claim 1, said support means comprising a bar having an upper portion extending inwardly and upwardly above said pin and open loop and including means adapted for securement to a vertical surface; said support means having a generally rectangular inwardly projecting portion below said lower locking means, also adapted to be secured to a vertical surface and including a horizontal support for the bottom of said rear wheel and an inner L-shaped channel adapted to engage and hold steady said rear wheel.

4. A bicycle parking and storage rack according to claim 1, in which said enclosed channel is positioned such that it will not be blocked by kickstands commonly attached to bicycles, and further in which the support means is fashioned to give sufficient space between said support means and the bicycle when in position to allow kickstands or extra-wide bicycles to be accommodated effectively.

5. A bicycle parking and storage rack comprising a plurality of radially arranged parking and storage segments, each segment having:
   support means adapted to support a bicycle in a vertical position including an upper pin adapted to engage a front wheel of a bicycle and lower support means for a rear wheel of a bicycle;
   locking means pivotably mounted to the right of and adjacent support means having an L-shaped finger at the upper end thereof adapted to be pivoted into contact with the adjacent upper pin and to capture the front wheel of a bicycle supported by the said adjacent pin; and
   straight bar at the lower end of said locking means said bar being oriented to project across the opening of said radially arranged parking and storage segment when the L-shaped finger at the upper end of the locking means is in the open position;
   said straight bar being further positioned so that a rear wheel of a bicycle being inserted into said segment will strike it and push it inwards, moving the locking means and hence the L-shaped finger at the upper end of the locking means;
   said finger being positioned so that as said straight bar is pushed inwards by the rear wheel said finger will rotate to the closed position and engage said upper pin;
   and further in which a stationary bracket is attached to the outside of the support means, through which a portable locking device may be passed and attached through the bicycle seat stays or chain stays.

6. A bicycle parking and storage rack according to claim 5, said parking and storage segments being unitary and being mounted on a circular base.

7. A bicycle parking and storage rack according to claim 6, said circular base being rotatably supported by a base member having bearing means.

8. A bicycle parking and storage rack according to claims 5, 6 or 7, having ten of said segments.

* * * * *